United States Patent [19]

Hayakawa et al.

[11] Patent Number: 5,029,688
[45] Date of Patent: Jul. 9, 1991

[54] LUBRICATION DEVICE FOR A ONE-WAY CLUTCH IN AN AUTOMATIC TRANSMISSION

[75] Inventors: Youichi Hayakawa, Toyoake; Chichiro Hosono, Anjo; Masaaki Nishida, Anjo; Shingo Uozumi, Anjo, all of Japan

[73] Assignee: Aisin Aw Co., Ltd., Aichi, Japan

[21] Appl. No.: 293,252

[22] Filed: Jan. 4, 1989

[30] Foreign Application Priority Data

Aug. 11, 1988 [JP] Japan .................. 63-201398

[51] Int. Cl.$^5$ .............................. F16D 13/74
[52] U.S. Cl. .................. 192/113 B; 475/318
[58] Field of Search ............. 74/785, 467; 192/41 R, 192/113 B; 184/6.12, 264 B; 188/264 B; 475/317, 318

[56] References Cited

U.S. PATENT DOCUMENTS

| | | | |
|---|---|---|---|
| 2,027,012 | 1/1936 | Barnes | 184/6.12 X |
| 2,762,233 | 9/1956 | Orr | 74/467 |
| 3,209,620 | 10/1965 | Moan | 74/785 X |
| 4,714,146 | 12/1987 | Moroto et al. | 192/85 AA |
| 4,759,432 | 7/1988 | Jürgens et al. | 192/113 B X |
| 4,782,931 | 11/1988 | Lederman | 74/467 X |
| 4,800,780 | 1/1989 | Sivalingam | 74/785 |
| 4,800,782 | 1/1989 | Sivalingam | 74/785 |
| 4,825,725 | 5/1989 | Premiski et al. | 74/467 X |
| 4,848,177 | 7/1989 | Miura et al. | 74/785 X |

FOREIGN PATENT DOCUMENTS 62-141341  6/1987  Japan .
63-145846  6/1988  Japan .

*Primary Examiner*—Allan D. Herrmann
*Assistant Examiner*—Khoi Q. Ta
*Attorney, Agent, or Firm*—Kanesaka and Takeuchi

[57] ABSTRACT

A ring gear and an outer race of a one-way clutch are linked and secured in the axial direction. The outer peripheral section of a disk-shaped supporting member engages teeth of the ring gear and supports the ring gear, and a tapered snap ring is mounted in an indented groove with a tapered surface formed in the ring gear so that the side surface of the outer peripheral section of the support member is in intimate contact with the end surface of the outer race, and the support member is thus secured and prevented from withdrawing. An oil sump for lubricant supplied from the inner radial side is formed on the inner peripheral part of the outer race defined by the intimately contacted outer race and the support member. The ring gear of the planetary gear unit rotates when the automatic transmission actuates, and the integral support member also rotates based on the rotation of the ring gear. At this time, the side surface of the outer peripheral section of the support member is in intimate contact with the end surface of the outer race because of the tapered snap ring, and the lubricant supplied from the inner radial side is stored in the inner radial part of the outer race, which becomes the oil sump to lubricate the one-way clutch.

4 Claims, 6 Drawing Sheets

| | | First Automatic Transmission Mechanism 1 | | | | | | | Second Automatic Transmission Mechanism 27 | | |
|---|---|---|---|---|---|---|---|---|---|---|---|
| | | C1 | C2 | B1 | B2 | B3 | F1 | F2 | C3 | B4 | F3 |
| | P | | | | | | | | | ○ | |
| | R | | ○ | | | ○ | | | | ○ | |
| | N | | | | | | | | | ○ | |
| D | 1 | ○ | | | | | | ○ | | ○ | ○ |
| D | 2 | ○ | | (○) | ○ | | ○ | | | ○ | ○ |
| D | 3 | ○ | | (○) | ○ | | ○ | | ○ | | |
| D | 4 | ○ | ○ | | ○ | | | | ○ | | |
| 3 | 1 | ○ | | | | | | ○ | | ○ | ○ |
| 3 | 2 | ○ | | ○ | ○ | | ○ | | | ○ | ○ |
| 3 | 3 | ○ | | ○ | ○ | | ○ | | ○ | | |
| 2 | 1 | ○ | | | | | | ○ | | ○ | ○ |
| 2 | 2 | ○ | | ○ | ○ | | ○ | | | ○ | ○ |
| 1 | 1 | ○ | | | | ○ | | ○ | | ○ | ○ |
| 1 | 2 | ○ | | ○ | ○ | | ○ | | | ○ | ○ |

LUBRICATION DEVICE FOR A ONE-WAY CLUTCH IN AN AUTOMATIC TRANSMISSION

BACKGROUND OF THE INVENTION

1. Field of the Invention

The present invention relates to an automatic transmission equipped with a planetary gear unit, and, in particular, to a mechanism linking a ring gear and its support member.

2. Description of the Prior Art

Recently, the applicant of the present invention proposed an automatic transmission, as disclosed in Japanese Laid Open Patent No. SHO-62-141341, wherein this automatic transmission is provided with a planetary gear comprising a single planetary gear and a dual planetary gear. Sun gears of these two planetary gears are integrally connected together, and carriers of these two planetary gears are also integrally connected together. The carrier is linked to a counter-drive gear which serves as an output member, an input shaft and a ring gear of the single planetary gear are linked through a first clutch, the input shaft and the sun gear are linked through a second clutch, the sun gear engages a second brake through a first brake of a first one-way clutch, and a ring gear of the dual planetary gear engages a third brake or a second one way clutch, whereby an automatic transmission mechanism section with a forward three speed is provided by operating these clutches and brakes.

An outer race of the second one-way clutch is integrally secured to and supported by a forward end of the ring gear of the dual planetary gear, specifically, a ring gear of larger diameter. A support plate extending to the inner radial side is secured to a rear end of this ring gear. The support plate is free rotationally supported between a tip side carrier which supports a pinion of the dual planetary gear and the ring gear of the single planetary gear through a thrust bearing. Accordingly, a space is maintained between the side surface of the second one-way clutch and the carrier side surface.

In addition, the applicant of the present invention has proposed, as disclosed in Japanese Laid Open patent No. SHO 63-145846, an automatic transmission wherein the ring gear of the above mentioned dual planetary gear is supported by means of a disk-shaped support member and the automatic transmission itself is anchored to a support member by means of a snap ring.

Accordingly, in Japanese Laid Open Patent No. SHO-62-141341, the lubricating oil supplied to lubricate the second one-way clutch flows out through the space between the carrier and the side surface of the second one-way clutch and the space between the ring gear of the dual planetary gear and the carrier, so that the second one-way clutch is not properly lubricated, and during high speed rotation in particular, this can cause seizure of the one-way clutch.

Also, as disclosed in Japanese Laid Open Patent No. SHO-63-145846, the ring gear R2 of the dual planetary gear is supported by a disk-shaped support member 4 and anchored by a snap ring 3'. As indicated in FIG. 2b, because the snap ring 3' is simply engaged in the indented channel 14' to prevent the snap ring 3' from ejecting, a space k is created between the outer race 17 of the one-way clutch and the support member 4, and the lubricating oil flows out from the space k, so that the one-way clutch is not properly lubricated. In the same way as previously outlined, during high speed rotation in particular, this can cause seizure of the one-way clutch.

SUMMARY OF THE INVENTION

An object of the present invention is to provide, with due consideration to the drawbacks of such conventional devices, a lubrication device for a one-way clutch in an automatic transmission using a tapered snap ring for connecting a ring gear and a support member for the ring gear.

In the present invention, for example, as shown in FIG. 1 and FIG. 2a, an automatic transmission (A) is provided with a planetary gear unit (2) and a one way clutch (F2) interposed between a ring gear (R2) for the planetary gear unit and a securing member (61), wherein the ring gear (R2) and the outer race (17) of the one-way clutch (F2) are arranged in the axial direction and are linked and secured together. The outer peripheral section (4a) of a disk-shaped supporting member engages the teeth of the ring ear (R2) and supports the ring gear (R2), and in order that the side surface (4d) of the outer peripheral section of the support member is in intimate contact with the end surface (17a) of the outer race, a tapered snap ring (3) is mounted in an indented groove (14) with a tapered surface (14a) formed in the ring gear (R2), and the support member (4) is thus secured and prevented from withdrawing. An oil sump for the lubricating oil supplied from the inner radial side is defined on the inner peripheral part (17b) of the outer race by the intimately contacted outer race (17) and the support member (4).

As a result of the above structure, the ring gear (R2) of the planetary gear unit (2) rotates, based on operation of the automatic transmission (A). Then, the integral support member (4) also rotates by the rotation of the ring gear (R2). At this time, the side surface (4d) of the outer peripheral section of the support member is, based on the tapered snap ring (3) placed in intimate contact with the end surface of the outer race, so that the lubricating oil supplied from the inner radial side is stored in the inner radial part (17b) of the outer race, which becomes an oil sump, and lubricate the one-way clutch (F2).

Incidentally, the reference numerals in the parenthesis are used only for reference with the drawings and do not limit the structure of the invention. The same number may be named differently in the following description and in the previous description in which broader concepts are adopted.

BRIEF DESCRIPTION OF THE DRAWINGS

FIG. 2 (b) is an enlarged cross sectional view of a conventional mechanism.

FIG. 4 is an illustration showing the operation of the automatic transmission of FIG. 3.

DETAILED DESCRIPTION OF THE PREFERRED EMBODIMENTS

Figure 3:
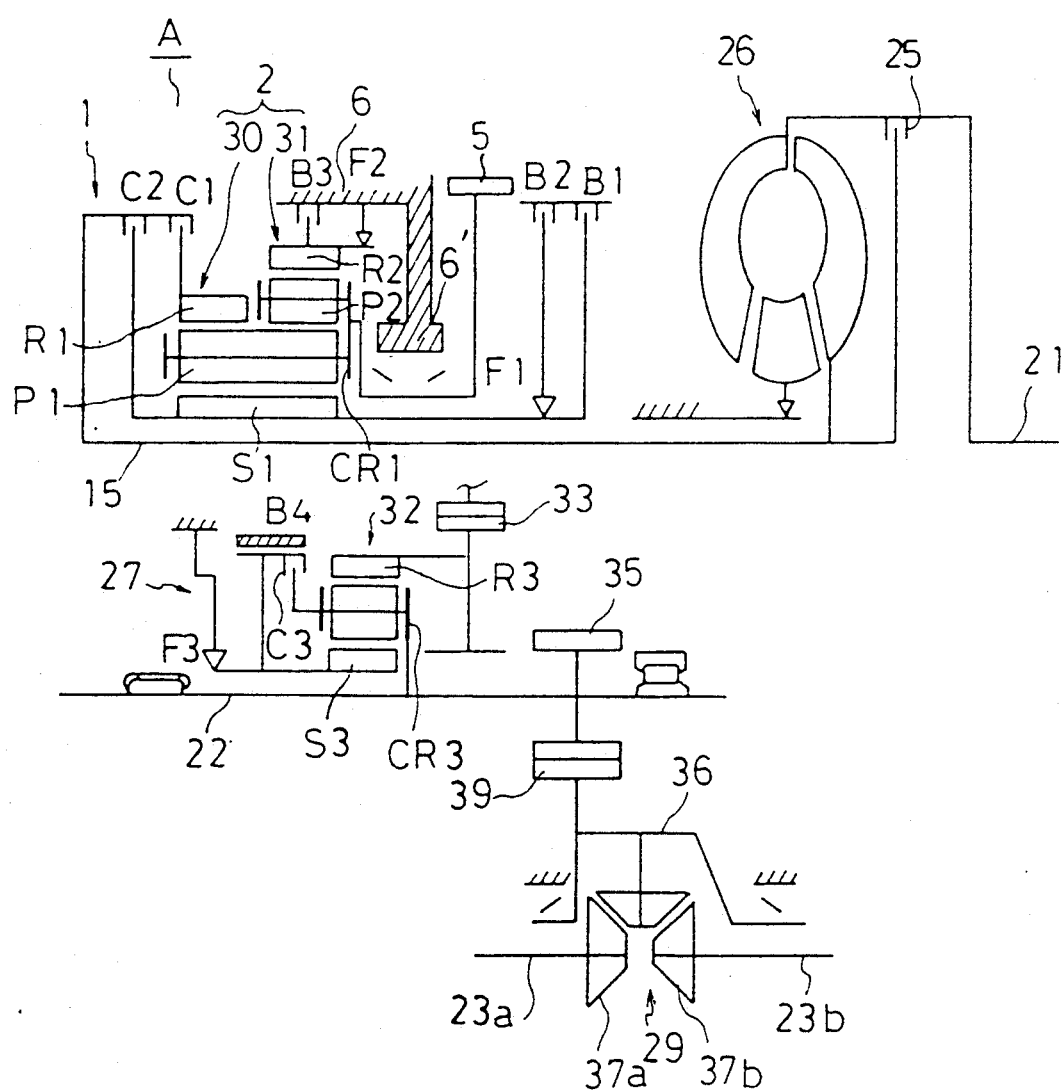
FIG. 3 is a schematic illustration of the automatic transmission to which the present invention is applied.

Now referring to FIG. 3, an automatic transmIssion A applicable to the present invention comprises three shafts, that Is an input shaft 15 aligned with an engine crank shaft 21, a counter shaft 22, and a front axle shaft formed of shafts 23a, 23b. A first automatic transmission mechanism section 1 and a torque converter 26 with a lockup clutch 25 are supported on the input shaft 15, and a second automatic transmission mechanism section 27 is supported on the counter shaft 22. A front differential device 29 is supported on the front axle shafts 23a, 23b.

The first automatic transmission mechanism section 1 comprises a planetary gear unit 2 assembled from a single planetary gear 30 and a dual planetary gear 31. In the planetary gear unit 2, the common sun gear S1 of the two planetary gears and the common carrier CR1 are formed and in addition, a long pinion P1 is engaged with the sun gear S1. The input shaft 15 and a ring gear R1 of the single planetary gear 30 are linked through a first (forward) clutch C1, and the input shaft 15 and the sun gear S1 are linked through a second (reverse and direct) clutch C2. The sun gear S1 is directly engaged with and stopped by the first brake B1, and prevented from rotating in one direction by means of the second brake B2 through a first one-way clutch F1. A ring gear R2 of the dual planetary gear 31 is directly engaged with and stopped by a third brake B3, and prevented from rotating in one direction by a second one-way clutch F2. The carrier CR1 is linked to a counter drive gear 8 which is supported on the casing bulkhead. The gear 5 is an output member of the automatic transmission mechanism section 1.

The second automatic transmission mechanism section 27 has a single planetary gear S2. The sun gear S3 and a carrier CR3 of the planetary gear 32 are linked to each other through a third (direct) clutch C3. In addition, the sun gear S3 is directly engaged with and stopped by a fourth (under-drive) brake B4, and is prevented from rotating in one direction by means of a one-way clutch F3. The ring gear R3 engages the counter drive gear 5 and is linked to a counter-driven gear 33 which is the input member of the automatic transmission mechanism section 27. The carrier CR3 is linked to the counter shaft 22. A reducing gear 35 which is the output member of the automatic transmission mechanism section 27 is secured to the counter shaft 22.

The front differential device 29 comprises a differential carrier 36 and a pair of left and right sun gears 37a, 37b. A ring gear 39 is secured to a gear mounting casing which forms the differential carrier 36. The ring gear 39 engages the reducing gear 35 to complete the speed reducing mechanism. The left and right gears 37a, 37b are linked to the left and right front axle shafts 23a, 23b respectively.

The operation of the automatic transmission A will now be explained with reference to FIG. 4.

The rotation of the engine crank shaft 21 is transmitted to the input shaft !B through the torque converter 26 or the lockup clutch 25. In the first speed status in the D range, the first clutch C1 is placed in an engaged state, and the fourth brake B4 is in a stopped state. In this status, in the first automatic transmission mechanism section 1, the rotation of the input shaft 15 is transmitted to the ring gear R1 of the single planetary gear 30 through the first clutch C1, and the ring gear R2 of the dual planetary gear 31 is prevented from rotating by the second one-way clutch F2, so that while the sun gear S1 is idling in the reverse direction, the common carrier gear CR1 is caused to rotate at a greatly reduced speed in the forward direction, and rotation is produced through the counter drive gear 5. In the second automatic transmission mechanism section 27, the sun gear S3 is stopped by means of the fourth brake B4 and the third one-way clutch F3, so that the rotation from the counter-driven gear 33 is produced as a reduced speed rotation in the carrier CR3 from the ring gear R3. Accordingly, the first speed rotation of the first automatic transmission mechanism section 1 and the reduced speed rotation of the second automatic transmission mechanism section 27 are combined, and the rotation is transmitted to the front differential device 29 through the reducing gear 35 and the ring gear 39, and is then transmitted to the left and right front axle shafts 23a, 23b.

In the second speed status in the D range, the second brake B2 is activated in addition to the connection of the first clutch C1 and the action of the fourth brake B4. Whereupon the rotation of the sun gear S1 is halted from the action of the first one-way clutch F1 based on the brake B2. Accordingly, with the rotation of the first ring gear R1 through the input shaft 15, while the ring gear R2 of the dual planetary gear 31 is being idled in the forward direction, the carrier CR1 rotates with reduced speed in the forward direction, and the rotation is produced as the second speed in the counter drive gear 5. The second automatic transmission mechanism section 27 remains unchanged at reduced speed. The second speed of the first automatic transmission mechanism section 1 is combined with the reduced rotation of the second automatic transmission mechanism section 27, and the resulting rotation is transmitted to the front axle shafts 23a, 23b.

Incidentally, simultaneously the first brake B1 may be activated, so that the large transmission torque reaction upon up-shifting is dispersed and borne in the first brake B1 and the second brake B2, and that the engine brakIng is operated upon coasting.

In the third speed status in the D range, the first automatic transmission mechanism section 1 maintains the second speed status without change, and when the fourth brake B4 in the second automatic transmission mechanism section 27 is released, the third clutch C3 is sun gear S3 become connected to each other, and the planetary gear 32 rotates as one unit to produce direct rotation in the counter shaft 22. At this time, the fourth brake B4 is released a little before the engagement of the third clutch C3, and shifting is made by the third one-way clutch F3 preventing transmission from becoming impossible. Accordingly, the two-speed rotation of the first automatic transmission mechanism section 1 and the direct rotation of the second automatic transmission mechanism section 27 are combined, and the third speed is obtained as a whole in the automatic transmission A.

The fourth speed status in the D range is obtained from the third speed status with the second clutch C2 placed in engagement. Whereupon, rotation is transmitted to the ring gear R1 through the first clutch C1 from the input shaft 15, and to the sun gear S1 through the second clutch C2. The planetary gear unit 2 rotates integrally, and rotation is directly transmitted to the counter-driven gear 5. Then, the directly connected rotation of the first automatic transmission mechanism section 1 and the directly connected rotation of the second automatic transmission mechanism section 27 are combined. In addition, the counter drive gear 5 and the driven gear 33 are in a prescribed acceleration relationship, so that the entire automatic transmission A is subjected to overdrive rotation. At this time, in case that the first brake B1 is activated in the second and third speeds, when an upshift is made to the fourth speed, the first brake B1 is activated a little ahead of time, so that while the sun gear S1 is being stopped by the one way clutch F1, the second clutch C2 is engaged, and shift shock upon interchange is prevented.

In addition, the third range is the same as the status where the first brake B1 is activated during the application of the second and third speeds in the previously mentioned D range having the first, second and third speeds.

Also, the second range is the same as the first and second speed status in the above third range.

In the first speed status in the first range, in addition to the engagement of the first clutch C1 and the action of the fourth brake B4, the third brake B3 is activated. In this status, the ring gear R2 is stopped when engaged by the second one-way clutch F2, and the third brake B3 is stopped without regard to the direction of rotation, so that the engine brake is activated. In addition, the second speed status is the same as the second speed status in the second range.

In the reverse range, the second clutch C2 is engaged, and at the same time, the third brake B3 and the fourth brake B4 are activated. In this status, the rotation of the input shaft 15 is transmitted to the sun gear S1 through the second clutch C2. Also in this status, the ring gear R2 of the dual planetary gear 31 is secured by the action of the third brake B3, so that while the ring gear R1 of the single planetary gear 30 is made to rotate in reverse, the carrier CR1 also rotates in reverse, and the reverse rotation of the carrier is produced at the counter drive gear 5. Further, the speed of the reverse rotation of the counter drive gear 6 is reduced by the second automatic transmission mechanism section 27 and is transmitted to the front axle shafts 23a and 23b.

Next, an explanation will be given of the automatic transmission A by means of a specific embodiment with reference to FIG. 5.

The automatic transmission A has an integral casing apparatus comprising a transaxle casing 6, a transaxle housing 41, and a rear cover 42. The input gear 3, the counter shaft 22, and the ring gear mounting casing 36 which is differential carrier of the front differential device 29 are free rotationally supported in the casing apparatus. Then, the torque converter 26 which has a lockup clutch, and the first automatic transmission mechanism section 1 are positioned on the input shaft 15. The second automatic transmission mechanism section 27 is positioned on the counter shaft 22. In addition, a valve body 44 is positioned on the transaxle casing 6.

In the first automatic transmission mechanism section 1, a brake section 43, an output section 45, the planetary gear unit 2, and a clutch section 47 are arranged in order in the axial direction from the engine crank shaft 21 to the rear. An oil pump 49 is positioned between the brake 43 and the torque converter 26. A hollow shaft 50 is free rotationally supported by the input shaft 15.

Figure 2:
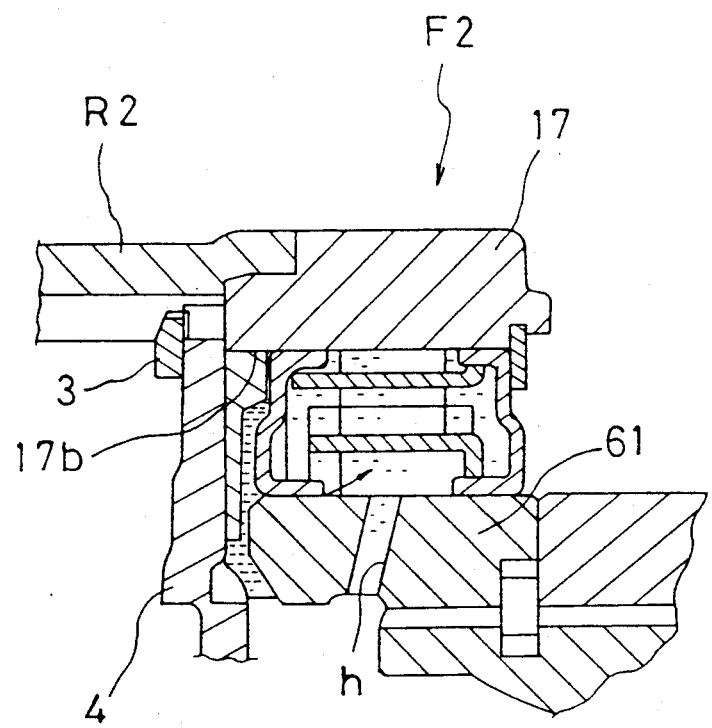
FIG. 2 (a) is an enlarged cross sectional view of a main section present invention.
Figure 2:
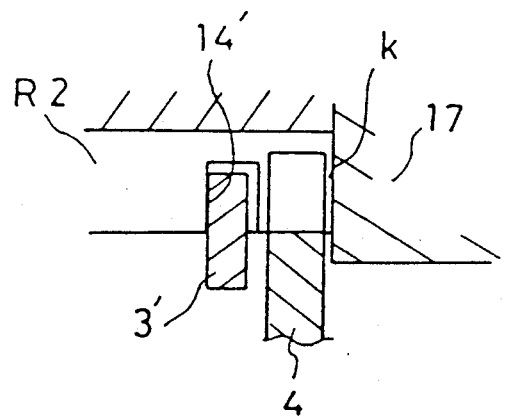

The planetary gear unit 2 comprises the single planetary gear 30 and the dual planetary gear 31, as shown in FIG. 2. The single planetary gear 30 comprises the sun gear S1 formed on the hollow shaft 80, the ring gear R1, and the carrier CR1 which supports the pinion P1 which engages the ring gear R1 and the sun gear S1. The dual planetary gear 31 comprises the sun gear S1 formed on the hollow shaft 50, the ring gear R2, and the carrier CR1 which supports the first pinion P1 and the second pinion P2 to mutually engage together, wherein the first pinion P1 is engaged with the sun gear S1, and the second pinion P2 is engaged with the ring gear R2. Both the planetary gears 30, 31 have gears with the same number of teeth, which form a common gear, that is the sun gear S1 on the hollow shaft 50. The carriers are integrally connected to form a carrier CR1 and the pinion P1 is formed from an integral long pinion.

The brake section 43 comprises the first one-way clutch F1, the first brake B1 comprising a multiplate brake and the second brake B2 comprising a multiplate brake, which are arranged in the brake section 43 in order from the radially inner side to the radially outer direction. In addition, a hydraulic actuator 51 is formed adjacent to the first brake, and a hydraulic actuator 52 is formed adjacent to the second brake. The hydraulic actuators 51, 52 are radially juxtaposed and secured to the cover of the respective oil pump 49. In addition, the first brake B1 is connected to the hollow shaft 50, and the inner race of the first one-way clutch F1 is connected to the hollow shaft 60 with its outer race connected to the second brake B2.

Figure 1:
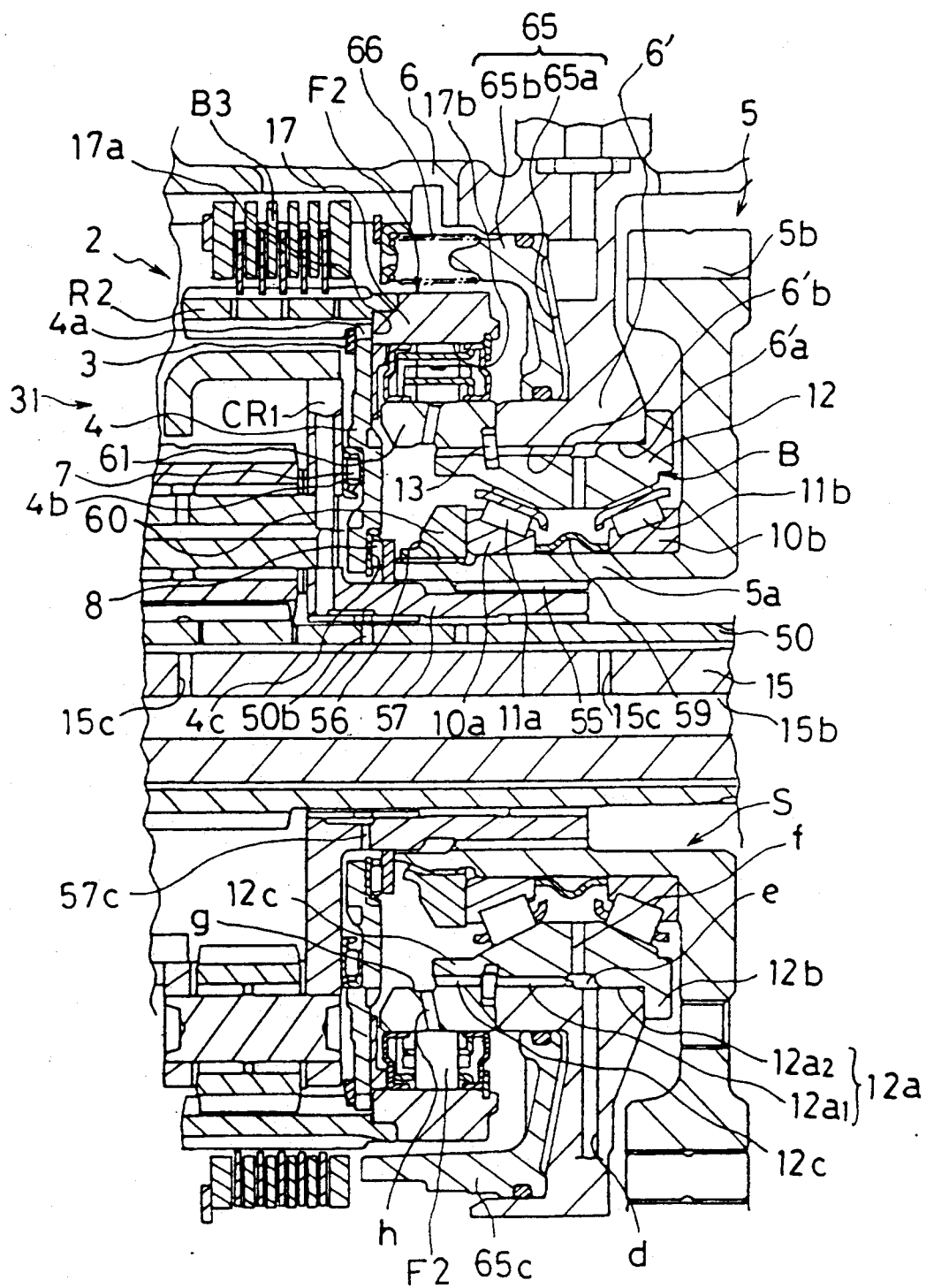
FIG. 1 is a cross sectional view of the one-way clutch lubrication device of the present invention.

An output section 45 is positioned at almost dead center of a first automatic transmission mechanism section 1 and is equipped with a counterdrive gear 5. The counterdrive gear 5, as shown in more detail in FIG. 1, is provided with a boss section 5a of a specified length and a large diameter gear section 5b. In addition, a spline 55 is formed on the inner peripheral surface of the boss section 5a. Also, a screw 56 of a specified length is formed on the rear end of the boss section 5. In addition, in the counterdrive gear 5, the outer peripheral surface of the boss section is free rotationally supported through a bearing unit B by a bulkhead 6' formed in the transaxle casing 6, and the boss section 57 of the carrier CR1 engages the boss section spline 56. The bearing unit B is a double tapered bearing comprising two arrays of inner races 10a, 10b, two arrays of tapered rollers 11a, 11b, and a single outer race 2. The two arrays of inner races 10a, 10b are engaged with the outer peripheral surface of the countergear boss section 5a with a plastic spacer 59 interposed therebetween, a nut 60 is tightened on the screw 56, and a certain plate load is applied. Also, the outer race 12 comprises an engaging section 12a engaged in the support surface of the casing bulkhead 6', a collar section 12b which expands in the outer radial direction on the front edge side of the engaging section 12a, and an extension section 12c which extends for a specified length from the rear end side of the engaging section 12a. In addition, the engaging section 12a comprises an alignment section $12a_2$ and a spline section $12a_1$. A spline $12c_1$ extending from the spline section $12a_1$ is formed on the extension section 12c. An annular indented groove having a tapered rear end surface is formed in the extension section 12c, and by the installation of a tapered snap ring 13 in this indented groove, the casing bulkhead 6' is interposedly supported between the collar section 12c and the snap ring 13 wherein the action of a certain tensile stress is applied to the outer race 12. The alignment section $12a_2$ of the engaging section of the outer race 12 intimately contacts the alignment section 6'a of the casing support surface for alignment, and the spline section $12a_1$ engages the spline section 6'b and prevents rotation. On the outer periphery of the extension section 12c an inner race 61 of the second one-way clutch F2 is engaged and supported by a spline.

In addition, a lubricant oil hole d is formed in the casing bulkhead 6' and a space e is formed between the alignment section $12a_2$ in the outer race engaging surface 12a and the spline section $12a_1$. An oil hole f is formed in the outer race 12, and an annular indented section g is formed in the outer end of the inner peripheral surface of the inner race 61 of the second one-way clutch F2 to slightly project into the inner radial side. In addition, an oil hole h is a formed toward the sprag of the one-way clutch from the indented section g. An oil hole 57c is formed in the carrier boss section 57 which opposes the bearing 8. An oil hole 50b is formed in a hollow shaft 50 which is engaged with the boss section 57. In addition, a lubricant oil hole 15b is formed in the center section of an input shaft 15, and a cross-hole 15c is formed for the oil hole 15b in a suitable location.

The outer race 17 of the second one-way clutch F2 is secured in the ring gear R2 of the dual planetary gear 31, and the spline 4a of the disk-shaped support member 4 engages the ring ear R2. Also, as shown in FIG. 2a, because the tapered snap ring 3 is intimately engaged with the outer race 17 along the tapered surface 14a of the snap ring groove 14 formed in the ring gear tooth surface, the support member 4 is secured to the ring gear R2. Therefore, the tapered snap ring 3 is energized so that the side surface 4d of the support member 4 is intimately contacted with the side surface 17a of the outer race 17, and an oil pump for lubricant which is supplied to the one-way clutch F2 is formed in the inner peripheral surface 17b of the outer race 17.

The support member 4 is supported by the counter gear boss section 5a and the carrier CR1 through thrust bearings 7, 8 at the radially inner section surfaces 4b, 4c. Accordingly, the second one-way clutch F2 is juxtaposed in the axial direction between the planetary gear unit 3 and the casing bulkhead 6'c. In addition, the third brake B3 is interposed between the outer periphery of the ring gear R2 and the axle casing 6, and a cylinder is formed on one side of the surface section of the bulkhead 6'c. In addition, the hydraulic actuator 65 formed from a piston 65b is interposedly positioned between the one-way clutch F2 and the cylinder. Further, the hydraulic actuator 65 is provided with a cylindrical, comb-tooth shaped arm 65c. This arm extends in the axial direction through the radially outer side of the second one way clutch F2, so that a return spring 66 is arranged in the combtooth section and the third brake B3 is controlled.

Figure 5:
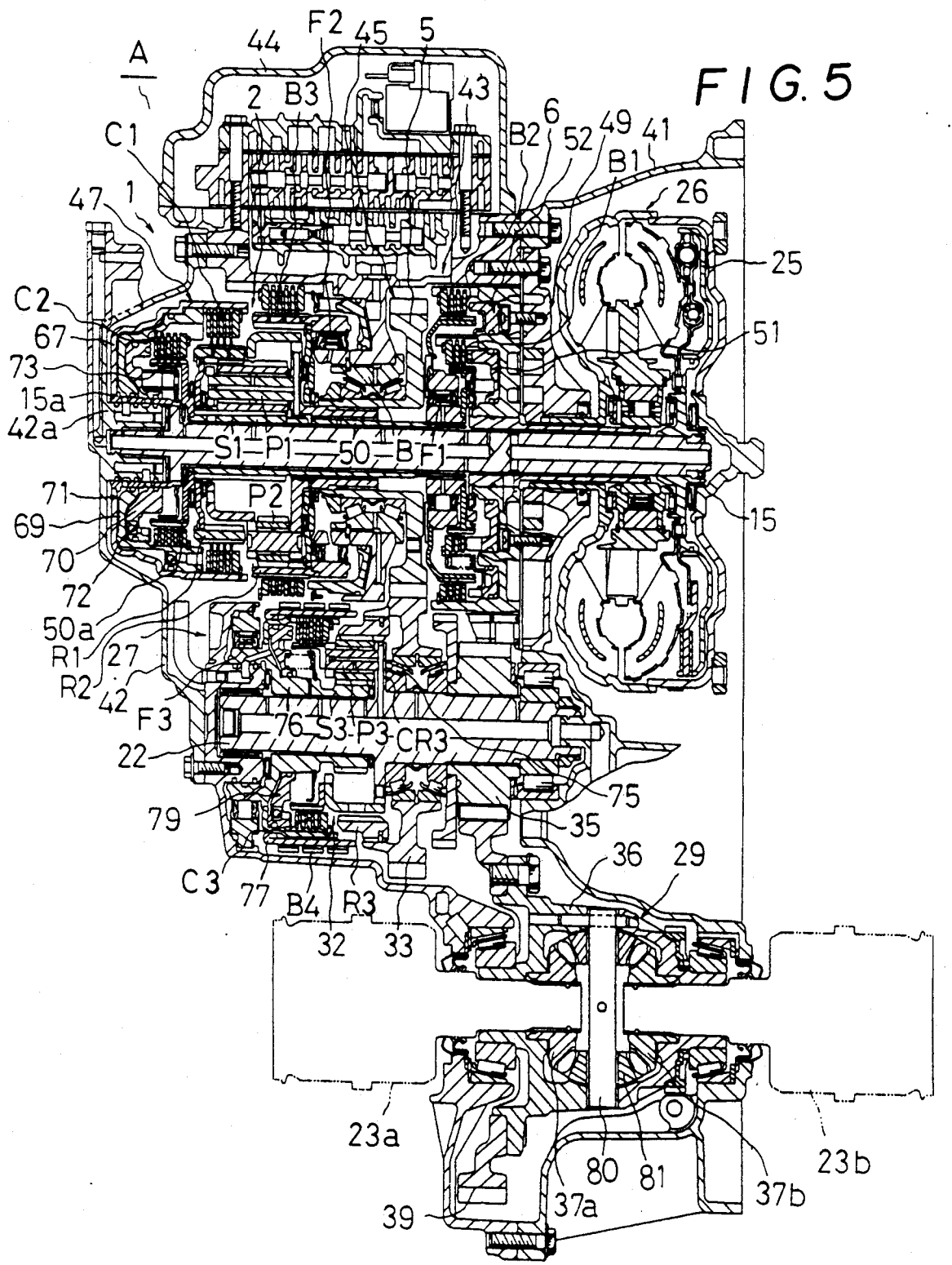
FIG. 5 is a cross sectional view generally showing the automatic transmission.

The clutch section 47 is provided with the first (forward) clutch C1 and the second (direct) clutch C2, as shown in FIG. 5, and is positioned at the rear edge of the first automatic transmission mechanism section 1 and housed in the rear cover 42. In addition, the rear edge section of the input shaft 15 forms the sleeve section 15a by which the boss section 42a of the cover 42 is engaged. In addition, a clutch drum 67 is integrally linked to the sleeve section 15a. A movable member 69 is engaged to freely slide only in the axial direction on the clutch drum 67 by means of a spline. A piston member 70 is fitted with the movable member 69. In addition, the movable member 69 defines an oil chamber cooperating with the cylinder which is formed from the inner peripheral surface of the clutch drum 67, thereby forming a hydraulic actuator 71 for use with the first clutch C1. A piston member 70 defines an oil chamber cooperating with the cylinder formed from the inner peripheral surface of the movable member 69, thereby forming a hydraulic actuator 72 for use with the second clutch C2. Set between the piston member 70 and the snap ring secured to the sleeve 15a is a spring 73, which forms a return spring which is common to the piston members 69, 70 of the hydraulic actuators 71, 72. In addition, the first clutch C1 is interposed between the spline formed on the inner peripheral surface of the radially outer section of the clutch drum 67 and the spline formed on the outer peripheral surface of the ring gear R1. The second clutch C2 is interposed between the spline formed on the inner peripheral surface of the radially outer section of the movable section 69 and the spline formed on the outer peripheral surface of the hub section 50a secured to the hollow shaft 60.

The second automatic transmission mechanism section 27 is provided with one single planetary gear 32. Also, the counter driven gear 33 is free rotationally supported on the counter shaft 22 through a bearing 75, and the reducing gear 35 is secured to the counter shaft 22. The ring gear R3 of the planetary gear 32 is linked to the counter-driven gear 33. The carrier CR3 which supports the pinion P3 is integrally formed by expansion in the radially outer direction of the counter shaft 22. The sun gear S3 is formed on a hub 76 which is free rotationally supported on the shaft 22. A drum 77 secured to the radially outer section of the hub is engaged on its outer peripheral surface by the fourth brake B4 which is a hand brake. The third clutch C3 is interposed between the inner peripheral surface of the drum 77 and the hub secured to the carrier CR3. A piston engages the hub 76 adjacent to the clutch C3 and forms a hydraulic actuator for the clutch C3. The third one-way clutch F3 is interposed between the extension of the hub 76 and the casing 6.

The front differential device 29 is provided with the ring gear mounting casing 36 which forms a differential carrier. The casing 36 is free rotationally supported on the housing 41 and casing 6 through a bearing. The large diameter ring gear 39 which engages the reducing gear 35 is secured to the mounting casing 36. In its inner section, a pinion gear 81 is free rotationally supported by a pinion shaft 80, and the right and left side gears 37a, 37b which engage the gear 81 are free rotationally supported. A pair of right and left front axle shafts 23a, 23b are respectively engaged and linked by the side gears 37a, 37b.

As a result of this structure of the present invention, lubricant, which is supplied from the oil hole d of the casing 6, is fed into the space e, and supplied to the tapered roller bearings 11a, 11b through the oiling hole f, and also supplied to the splines $12a_1$, $12c_1$. After lubricating the tapered roller bearing 11a and the splines $12c_1$ and $12a_1$, the lubricant is accumulated in the annular indented section g, and is supplied to the one-way clutch F2 through the oil hole h. The lubricant supplied through the oil hole 15b of the input shaft 15 passes through the cross-hole 15c, the oil hole 50b of the hollow shaft 50 and the oiling hole 57c of the boss section 57 of the carrier CR1, and lubricates the bearings 7 and 8. In addition, the lubricant which lubricates the bearing 8 flows together with the lubricant which has lubricated the tapered roller bearing 11a, and lubricates the one-way clutch F2 from the annular indented section g via the oil hole h, and flows into the oil sump 17b. In addition, this lubricant flows to the oil sump 17b through the space between the one-way clutch F2 and the support member 4. Then, based on the intimate contact of the support member 4 with the outer race 17 by the tapered snap ring 3, the lubricant stored in the oil sump 17b reliably lubricates the second one-way clutch F2 without flowing out of the feed section of the support member 4 and the outer race 17.

TECHNICAL ADVANTAGES OF THE INVENTION

As explained above, by means of the present invention, the tapered snap ring (3) is installed in the ring gear (R2) for intimate contact of the outer peripheral side section (4d) of the support member to the end surface (17a) of the outer race, so that the support member (4) is secured and prevented from coming out. The oil sump 17b is formed by the outer race (17) and the support member (4) in intimate contact for the lubricant supplied from the inner radial side in the inner peripheral part of the outer race, so that the lubricant is prevented from flowing oui of the space where the ring gear (R2) and the support member (4) engage. Also, the one-way clutch (F2) can be reliably lubricated within the oil sump (17b). As a result, even when the one-way clutch (F2) is rotating at high speed, seizure of the one-way clutch can be more reliably prevented.

What is claimed is:

1. A one-way clutch lubrication device for an automatic transmission, comprising:
   a stationary member,
   a planetary gear unit having a ring gear, said ring gear having teeth and a groove with a tapered side surface, both being formed on an inner periphery of the ring gear,
   a one-way clutch interposed between the stationary member and the ring gear, said one-way clutch having an outer race with an inner periphery, said outer race being arranged axially adjacent to and secured to the ring gear,
   a disk-shaped support member having an outer periphery engaging the teeth of the ring gear, said support member rotationally supporting the ring gear with the outer race of the one-way clutch,
   a tapered snap ring situated in the groove with the tapered side surface of the ring gear to securely connect the ring gear and the support member, said snap ring being in contact with the support member so that the support member closely contacts the outer race of the one-way clutch at all times, and
   a centrifugal oil sump defined by the inner periphery of the outer race of the one-way clutch and the support member for receiving lubricant therein and lubricating the one-way clutch.

2. A one-way clutch lubrication device according to claim 1, wherein:
   said planetary gear unit comprises a single planetary gear, a dual planetary gear and a common carrier, said ring gear being a ring gear for the dual planetary gear;
   said automatic transmission further includes a casing and a counter-drive gear;
   said stationary member is integrally connected to the casing to form a casing bulkhead, and said one-way clutch has an inner race, said casing bulkhead being connected to the inner race of the one-way clutch; and
   said support member is interposed between the common carrier of the planetary gear unit and an end of the counter-drive gear.

3. A one-way clutch lubrication device according to claim 1, further comprising rotational members, said support member being rotationally supported on the rotational members, said rotational members being the common carrier of the planetary gear and the counter-drive gear.

4. A one-way clutch lubrication device according to claim 1, wherein said tapered side surface of the groove of the ring gear is formed at a side opposite to the one-way clutch, and said tapered snap ring includes a tapered side wall, said tapered side wall contacting the tapered side surface when the tapered snap ring is situated in the groove.

* * * * *

UNITED STATES PATENT AND TRADEMARK OFFICE
CERTIFICATE OF CORRECTION

PATENT NO. : 5,029,688

DATED : July 9, 1991

INVENTOR(S) : Youichi Hayakawa et al

It is certified that error appears in the above-identified patent and that said Letters Patent is hereby corrected as shown below:

Title page, inventor's section, second inventor's name.

Change "Chichiro Hosono" to --Chihiro Hosono--.

Signed and Sealed this

Sixth Day of October, 1992

Attest:

DOUGLAS B. COMER

Attesting Officer

Acting Commissioner of Patents and Trademarks